Figure 1:
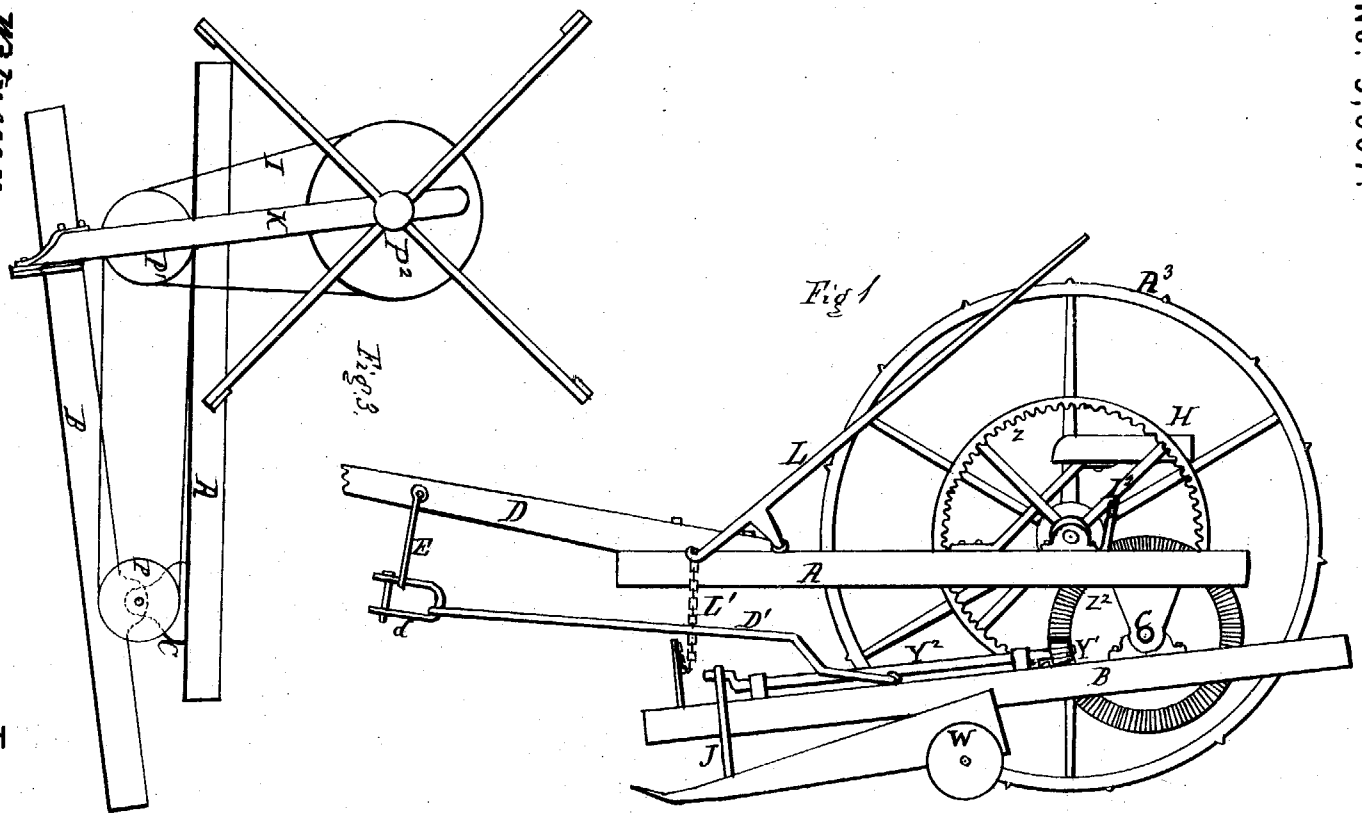

3 Sheets--Sheet 1.

T. N. FOSTER.
Harvesters.

No. 5,607. Reissued Oct. 14, 1873.

Witnesses
A. M. Smith
Alex Mahon

Inventor
H. H. Doubleday
Agent of Thomas N. Foster

AM. PHOTO-LITHOGRAPHIC Co. N.Y. (OSBORNE'S PROCESS)

3 Sheets--Sheet 2.

T. N. FOSTER.
Harvesters.

No. 5,607. Reissued Oct. 14, 1873.

Inventor

John Williams
Edwin J. McLain
Witnesses

H. H. Doubleday
Agent of Thomas N. Foster

AM. PHOTO-LITHOGRAPHIC CO. N.Y. (OSBORNE'S PROCESS)

3 Sheets--Sheet 3.

T. N. FOSTER.
Harvesters.

No. 5,607. Reissued Oct. 14, 1873.

Witnesses

John Williams

Edwin J. McLean.

Inventor

H. H. Doubleday assignee of Thomas N. Foster

AM. PHOTO-LITHOGRAPHIC CO. N.Y. (OSBORNE'S PROCESS)

UNITED STATES PATENT OFFICE.

THOMAS N. FOSTER, OF SOUTH PASS, ILLINOIS, ASSIGNOR TO HENRY H. DOUBLEDAY.

IMPROVEMENT IN HARVESTERS.

Specification forming part of Letters Patent No. 30,215, dated October 2, 1860; reissue No. 5,607, dated October 14, 1873; application filed March 16, 1872.

DIVISION B.

*To all whom it may concern:*

Be it known that I, THOMAS N. FOSTER, of South Pass, county of Union, State of Illinois, formerly of Watertown, county of Jefferson, State of New York, have invented certain new and useful Improvements in Harvesters for Grain, Grass, &c.; and I do hereby declare that the same is described and represented in the following specification and drawings.

To enable others skilled in the art to make and use my improvements, I will proceed to describe their construction and operation, referring to the drawings, in which the same letters indicate like parts in each of the figures.

Figure 2:
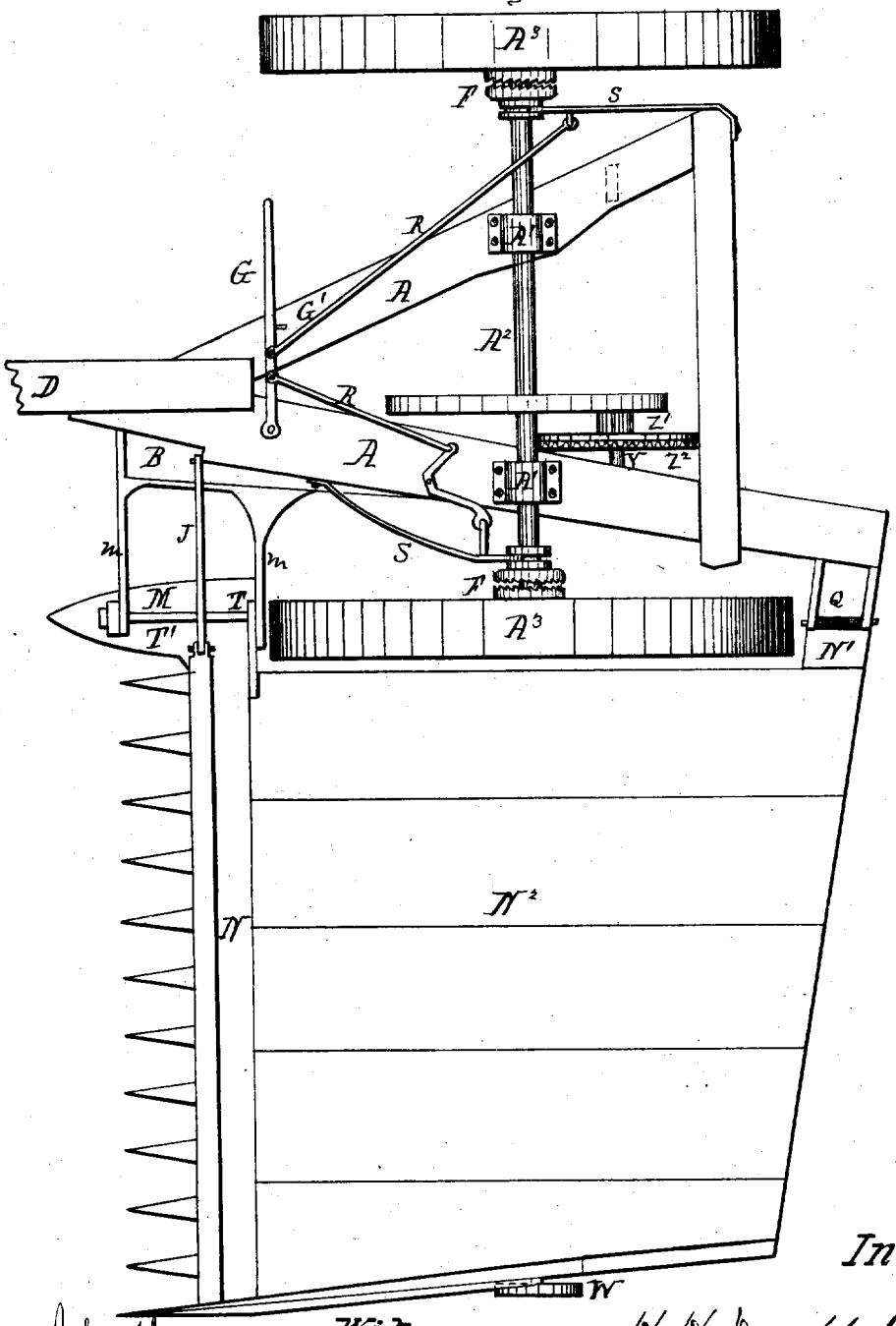
Figure 5:
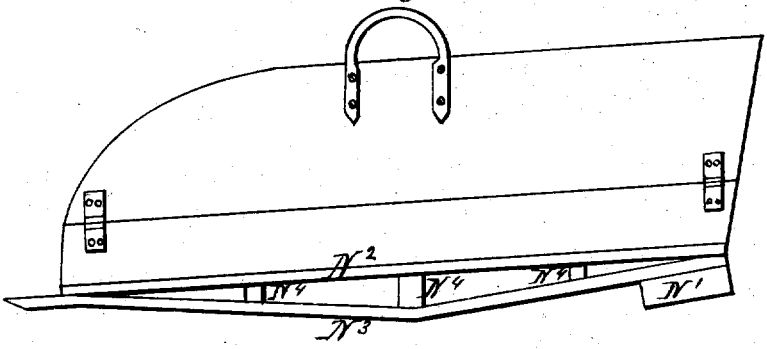
Figure 4:
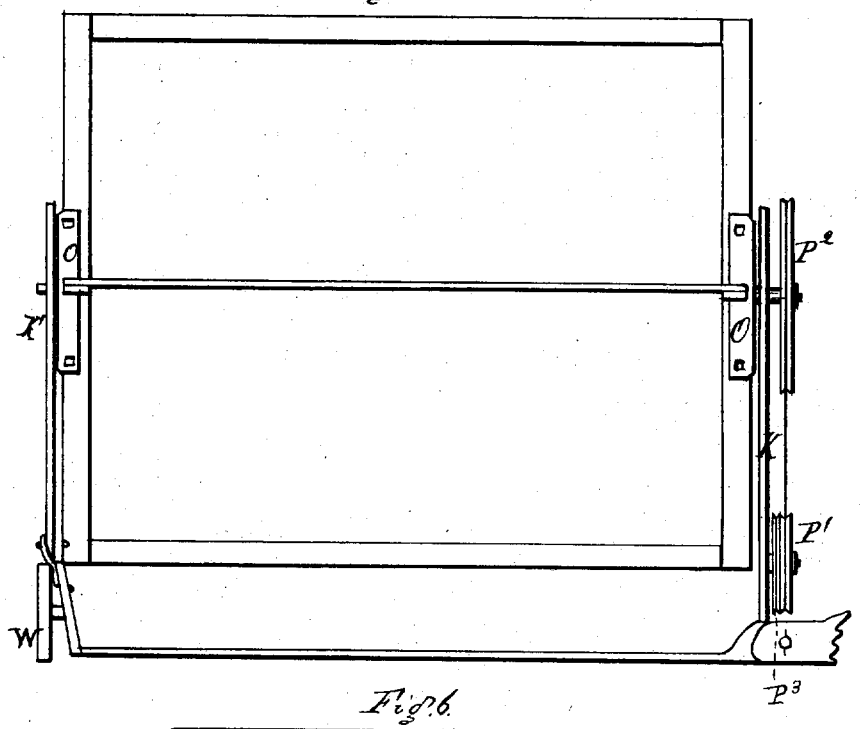

Figure 1 is an elevation of one side of my machine. Fig. 2 is a plan or top view. Fig. 3 is an elevation of the pulleys for the reel. Fig. 4 is a side elevation of the reel. Fig. 5 is a cross-section of the platform; and Fig. 6 is a cross-section, showing the connection of the frames A and B.

The invention relates to the construction, combination, and arrangement of parts in that class of harvesters usually denominated two-wheeled, front-cut machines. The invention consists in combining, with the belt which drives the reel, guide-pulleys arranged in such relation to the reel-shaft, the wheel or shaft from which the reel is driven, and the centers or pivots about which the platform and reel vibrate as they conform to the undulations of the ground, that a proper working tension of the belt which drives the reel is maintained at all times.

In the accompanying drawings, A A represent the main or tongue frame, to which the boxes $A^1$ $A^1$ are fastened for the axle $A^2$ to turn in, as shown in Fig. 2. The carrying and driving wheels $A^3$ are fitted to turn freely on the ends of the axle $A^2$, and both of them are provided with clutches, to correspond with the clutches F F, which slide on the axle over a feather, so arranged as to lock the wheels to the axle and turn it, to drive the cutting apparatus, as will be hereinafter described. The springs S S, fastened to the frame A, are fitted to grooves in the clutches F F, so as to press them out and lock the wheels to the shaft or axle. The links R R are connected to the springs S S and to the lever G, so that when the lever is pulled and placed before the stud G′ the clutches are drawn from the wheels, so that they turn freely on the axle, while the axle ceases to turn until the lever G is raised, so as to allow the springs to throw the clutches against the wheels and lock them to the axle again. D is a tongue or pole, rigidly secured to the main or tongue frame. B is a vibrating cutter or crank-shaft frame, arranged below the tongue-frame B, and the two frames are connected by hinges C C′, Figs. 1 and 6, so that the lower frame B, which carries the cutting apparatus, can vibrate and allow the cutting apparatus to follow the undulations of the ground. The lever L is pivoted to the main or tongue frame A A, and is connected by the chain $L^1$ to the front end of vibrating frame B, so as to raise it and hold it up by depressing the lever L, and placing it under the hook $L^2$ in the frame A. D′ is a link fastened to the frame B, and suspended at its front end from pole D by link E. Link D′ is provided with a clevis, *d*, Fig. 1, to which the whiffletrees are attached. Thus it will be seen that the draft of the horses is applied to the vibrating cutter-frame, and tends to lift the free end of said frame, to which the cutting apparatus is attached, from the ground. N is the finger-bar, and M is the finger-bar shoe. *m m* are ears or arms secured to the inner side of the front end of the vibrating cutter-frame B. The shoe M is pivoted to arms *m m*, its position being immediately in front of the wheel $A^3$, the object of this arrangement of the shoe being to provide a support for the reel-post when the machine is used as a reaper, in such position that the devices for driving the grain-gathering mechanism may be conveniently arranged and properly operated.

Figure 6:
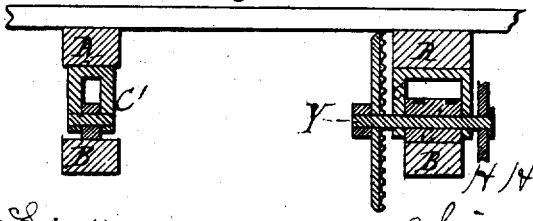

To operate the cutter-bar and cutters, the annular gear Z is fastened to the axle $A^2$, and turns the pinion $Z^1$ and gear $Z^2$ on the secondary shaft Y, which shaft is mounted in the hinge C, as shown in Figs. 1 and 6. The gear $Z^2$ turns the pinion $Y^1$ and crank-shaft $Y^2$, which turns in boxes fastened to the frame B, the crank being connected with the cutter-bar by the pitman J.

By an inspection of the drawings, it will be seen that pinion-shaft Y forms the pivot of hinge C, and that said shaft and the pivot of hinge C′ (shown in dotted lines in Fig. 2) are in a plane parallel with the main axle $A^2$, and that cutter-frame B can vibrate freely about shaft Y as a center without disturbing a proper working relation of the driving-gear.

By the employment of the flexible chain-connection $L^1$, I can suspend the cutter-frame B at any desired height from the ground, and yet, if one carrying-wheel should drop into a depression in the ground, the chain will allow the frame to rise without straining any part of the mechanism.

H is the driver's seat, mounted on the tongue-frame, substantially as shown, within convenient reach of levers L and G.

The clutches F F are so constructed that the machine may be backed without reversing the motion of the gearing, and that when one wheel turns faster than the other, as in turning corners, the fastest one shall drive the gearing. The reel-bearer K is fastened to a lug rising from shoe M, the bearer K′ being secured to the grain side of the platform some distance behind the cutter-bar. The reel is made of two frames, provided with journals, upon which the reel turns in the bearers. The ends of the arms composing the frames are connected by bars or beaters, forming a skeleton-reel without a central shaft, which will not be likely to become obstructed with grass or weeds. To turn the reel a pulley, P, is fastened to the shaft Y for the band I, which passes around pulley $P^1$, up over pulley $P^2$ on the journal of the reel, then around pulley $P^3$, to the pulley P again. The pulleys $P^1$ $P^3$ turn on a stud projecting from either the vibrating cutter-frame B, or from the reel-bearer K, as in Fig. 4. In either case, the cutting apparatus can rise and fall with cutter-frame B without materially varying the relation of the reel to its driving mechanism; and it will be readily understood that, as the cutters conform to the undulations of the ground over which it is being drawn, the reel and its driving mechanism maintain a uniform, or nearly uniform, relation to the cutters and to the platform $N^2$. This platform is supported at the front edge by the finger-bar N, and at the rear by bar $N^1$, which is hinged to cutter-frame B by a pivot, which is coincident with the pivot of shoe M, as shown at Q, Fig. 2, the grain side of the platform being mounted upon grain-wheel W, Figs. 1 and 2.

By this construction the driver can raise and lower the finger-bar and cutters at will, so as to cut the stubble long or short, or to pass obstructions.

Having thus described the nature and construction of my improvements, what I claim, and desire to secure, in this division of reissue, is—

The reel, adapted to follow the movements of the hinged cutting apparatus and grain-platform, in combination with guide-pulleys, arranged at or near the foot of the reel-post, for retaining the reel-band in proper working relation to the driving and reel pulleys, as described.

THOMAS N. FOSTER.

Witnesses:
L. T. LINNELL,
STOTON A. ROBINSON.